US009790128B2

(12) United States Patent
Garner et al.

(10) Patent No.: US 9,790,128 B2
(45) Date of Patent: Oct. 17, 2017

(54) LASER CONTROLLED ION EXCHANGE PROCESS AND GLASS ARTICLES FORMED THEREFROM

(71) Applicant: CORNING INCORPORATED, Corning, NY (US)

(72) Inventors: Sean Matthew Garner, Elmira, NY (US); Ming-Jun Li, Horseheads, NY (US); Xinghua Li, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/449,574

(22) Filed: Aug. 1, 2014

(65) Prior Publication Data

US 2015/0044445 A1 Feb. 12, 2015

Related U.S. Application Data

(60) Provisional application No. 61/862,994, filed on Aug. 7, 2013.

(51) Int. Cl.
*C03C 21/00* (2006.01)
*C03C 23/00* (2006.01)

(52) U.S. Cl.
CPC ........ *C03C 23/0025* (2013.01); *C03C 21/002* (2013.01)

(58) Field of Classification Search
CPC .......................................... C03C 21/00–21/008

(Continued)

(56) References Cited

U.S. PATENT DOCUMENTS 5,078,771 A * 1/1992 Wu ........................... C03C 4/06
428/410
5,285,517 A * 2/1994 Wu ......................... C03C 3/085
359/885

(Continued)

FOREIGN PATENT DOCUMENTS

EP          1163710         3/2011
JP       05034508 A   *   2/1993

(Continued)

OTHER PUBLICATIONS

JP 05034508 A—English language machine translation accessed at PAJ.*

(Continued)

*Primary Examiner* — Jason L Lazorcik
(74) *Attorney, Agent, or Firm* — Kevin M. Johnson

(57) ABSTRACT

A method for forming ion-exchanged regions in a glass article by contacting an ion source with at least one surface of the glass article, forming a first ion-exchanged region in the glass article by heating a first portion of the glass article with a laser, and forming a second ion-exchanged region in the glass article. Characteristics of the first ion-exchanged region may be different from characteristics of the second ion-exchanged region. A depth of the ion-exchanged region may be greater than 1 μm. A glass article including a first ion-exchanged region, and a second ion-exchanged region having different characteristics from the first ion-exchanged region. The thickness of the glass article is less than or equal to about 0.5 mm.

18 Claims, 5 Drawing Sheets

(58) Field of Classification Search
USPC .............................................. 65/30.13, 30.14
See application file for complete search history.

(56) References Cited

U.S. PATENT DOCUMENTS

| | | | |
|---|---|---|---|
| 6,442,974 | B1 | 9/2002 | Paananen et al. |
| 7,168,268 | B2 | 1/2007 | Czarnetzki |
| 8,802,581 | B2 | 8/2014 | Dejneka et al. |
| 2002/0050153 | A1* | 5/2002 | Schultz ............. B23K 26/0604 65/377 |
| 2004/0118157 | A1* | 6/2004 | Borek .................... B41M 5/262 65/30.13 |
| 2004/0168471 | A1* | 9/2004 | Czarnetzki ............. B44C 1/005 65/17.2 |
| 2005/0239004 | A1* | 10/2005 | Gahler .................... C03C 17/10 430/542 |
| 2006/0051047 | A1* | 3/2006 | Beall .................. C03C 10/0045 385/141 |
| 2006/0260364 | A1* | 11/2006 | Pun ...................... G02B 6/1345 65/386 |
| 2007/0172661 | A1* | 7/2007 | Fechner ................. A01N 59/16 428/409 |
| 2008/0204889 | A1* | 8/2008 | Suetsugu .................. C03C 3/11 359/652 |
| 2008/0295542 | A1* | 12/2008 | Rainer ................... B41M 5/262 65/446 |
| 2010/0067101 | A1* | 3/2010 | Suetsugu .................. C03C 3/11 359/361 |
| 2012/0216570 | A1* | 8/2012 | Abramov .............. C03C 21/008 65/30.14 |
| 2013/0005139 | A1 | 1/2013 | Krasnov et al. |
| 2015/0246847 | A1* | 9/2015 | Abdolvand ........... C03C 21/008 428/410 |

FOREIGN PATENT DOCUMENTS

| | | |
|---|---|---|
| JP | 2001-7002 | 1/2001 |
| JP | 2003-286048 | 10/2003 |
| JP | 2005-170768 | 6/2005 |
| WO | WO0214233 A1 * | 2/2002 |

OTHER PUBLICATIONS

Matsui (Matsui, S., et al., "Processing of Optical Micro-Lens by a Laser ion-Exchange Method", SPIE vol. 1751 Miniature and Micro-Optics (1992), pp. 128-139).*
Pask (Pask, J.A., Parmelee, C.W., "Study of diffusion in glass", J.Amer. Ceram. Soc., V26, I 8, (1943), pp. 267-277).*
Karlsson, S., "Modification of Float Glass Surfaces by Ion Exchange", Doctoral dissertation, School of School of Engineering, Linnaeus University 2012 ISBN: 978-91-86983-62-8.*
Machine Translation of JP 2001-7002.
Machine Translation of JP 2003-286048.
Machine Translation of JP 2005-170768.
Cattaruzza et al; "Modifications in Silver-Doped Silicate Glasses Induced by NS Laser Beams"; Applied Surface Science 257 (2011) 5434-5438.
Gawith et al; "Single-Mode UV-Written Buried Channel Waveguide Lasers in Direct-Bonded Neodymium-Doped SGBN" CLEO 2002 232-233.
Kanehira et al; "Ion Exchange in Glass Using Femtosecond Laser Irradiation"; Applied Physics Letters, 93, 023112 (2008).
Ljungstrom et al; "Self-Written Channels in Ion-Exchanged Waveguides; Experiment and Modelling of Photosensitivity"; CLEO 2002, 250-251.
Ruschin et al; "Modification of Refractive Index in Ag/Na Ion-Exchanged Glasses by Vacuum-Ultraviolet Pulse Laser Irradiation"; Applied Physics Letters, 78, 1844 (2001).
U.S. Appl. No. 12/856,840 Cited in Application Corresponds With U.S. Pat. No. 8802581.

* cited by examiner

# LASER CONTROLLED ION EXCHANGE PROCESS AND GLASS ARTICLES FORMED THEREFROM

CROSS-REFERENCE TO RELATED APPLICATIONS

This application claims the benefit of priority under 35 U.S.C. §119 of U.S. Provisional Application Ser. No. 61/862,994 filed on Aug. 7, 2013 the content of which is relied upon and incorporated herein by reference in its entirety.

BACKGROUND

Field

The present specification generally relates to performing ion exchange processes on glass articles and thin glass article formed therefrom. Particularly, the specification relates to using a laser energy source to control the ion exchange process.

Technical Background

Ion exchange processes for glass articles are known and used to strengthen glass articles, form optical waveguides, form antimicrobial surfaces, and for high-temperature marking. Ion exchange of glass is conventionally conducted by submerging a glass article in a molten salt bath, or heating a glass article that has a coating of an ion exchange medium on its surface. It is also known to use laser energy sources to perform localized heating of a substrate. However, conventional ion exchange processes are only capable of producing an ion exchange layer having a uniform depth and a single ion exchange composition.

A need exists for a method for efficiently forming ion exchanged thin glass substrates, and for forming three dimensional ion-exchanged regions within a glass substrate.

SUMMARY

According to embodiments, methods are disclosed for forming ion-exchanged regions in a glass article. The ion-exchanged regions may be formed by contacting an ion source with at least one surface of the glass article, forming a first ion-exchanged region in the glass article by heating a first portion of the glass article with a laser, and forming a second ion-exchanged region in the glass article. Characteristics of the first ion-exchanged region may be different from characteristics of the second ion-exchanged region.

In embodiments, methods are disclosed for forming thin ion-exchanged regions in a glass article. The method comprises contacting an ion exchange source with at least one surface of the glass article, and forming an ion-exchanged region in the glass article by heating a portion of the glass article with a laser. The depth of the ion-exchanged region may be greater than 1 µm.

In other embodiments, glass articles are disclosed. The glass articles may include a first ion-exchanged region and a second ion-exchanged region having different characteristics from the first ion-exchanged region. The thickness of the glass article may be less than or equal to about 0.5 mm.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 2($b$) is an IR transmission of $KNO_3$;

FIG. 2($c$) is an IR transmission of $AgNO_3$;

FIG. 8($b$) is a SIMS graph of a glass sheet that has not been subjected to an ion exchange process.

DETAILED DESCRIPTION

Figure 1:
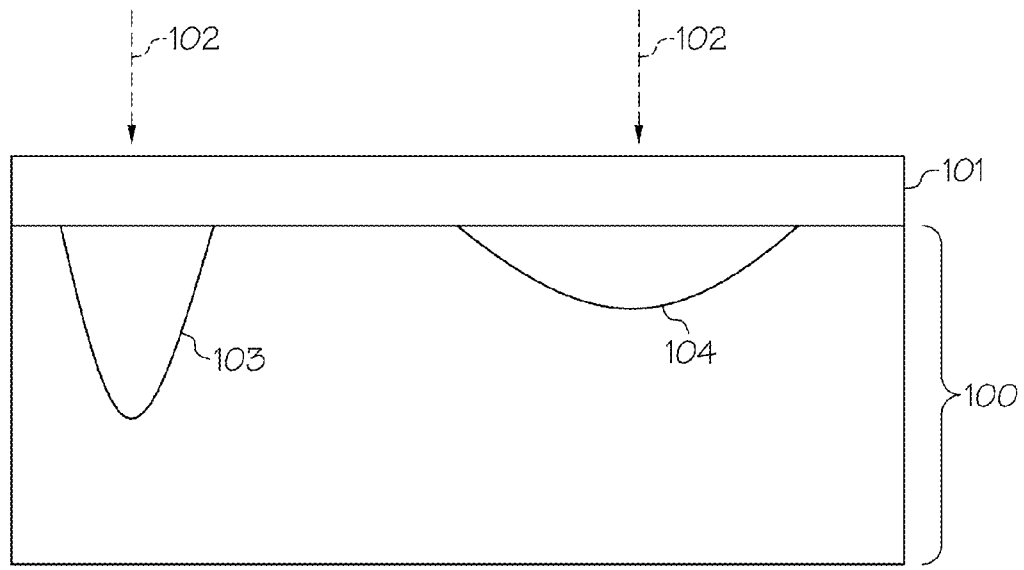
FIG. 1 schematically depicts embodiments of a glass article having ion-exchanged regions formed by laser energy incident on a surface of the glass article where an ion exchange source is contacted.

Ion exchange is a process known to strengthen glass articles, form waveguides, or add waveguide patterns to glass articles. Generally, the ion exchange process is used to replace ions within a glass matrix with other, often times larger, ions. For example, a glass matrix may be formed with, among other components, sodium. In an ion exchange process for the sodium-containing glass, sodium ions may be replaced with larger ions, such as potassium or silver. The ions added to the glass matrix via the ion exchange process may be chosen based on the end use of the glass article. For example, in embodiments where the end use of the glass article is in a display device, potassium ions may replace sodium ions in the glass matrix to provide increased surface strength. By replacing the smaller sodium ions with the larger potassium ions, a compressive stress is formed in the glass matrix, which provides strength to the surface of the glass article. As another example, for optical waveguide applications, the sodium ions may be replaced with silver ions to cause an increase in the optical refractive index of the material.

To replace ions in the glass matrix, the glass article may be heated to a temperature that is high enough to allow migration of the ions into and out of the glass article. Using the above example, a glass article containing sodium and a potassium ion source may be heated to a temperature of about 400° C. to enable mobility of the sodium ions, melting of a potassium ion source, and mobility of the potassium ions into the glass article. In conventional ion exchange processes, the ion source may be a molten salt bath that is heated to a temperature high enough to enable ion mobility into and out of the glass article. The glass article may then be placed into the molten salt bath for a time period that is sufficient to replace ions in the glass matrix with ions in the molten salt bath. In this process, the entire glass article is heated and all exposed surfaces experience ion exchange processes.

To control the location of the ion-exchanged regions, a mask may be used to create patterned ion-exchanged regions with a molten salt bath. For example, a material that is not susceptible to ion exchange may be applied to a surface of the glass article before the glass article is submerged in a molten salt bath, thus ion exchange will only occur between the ion exchange source and the portions of the glass article that are not covered by the mask material. Alternatively, to control the location of the ion exchange on the glass article, an ion exchange source, which may be a paste or a gel, may be contacted with certain areas of the surface of the glass article and then the glass article may be heated to a temperature that enables ion mobility, thereby allowing ions in the ion exchange source to replace the ions in the glass matrix.

In either of the above conventional methods, ion-exchanged regions in the glass article are substantially uniform. For example, because the entire glass article is heated to a temperature that enables ion migration within the glass matrix (i.e., by heating with a molten bath or by heating the entire glass article), the depth, concentration, and composition of ion-exchanged regions in the glass article will be similar unless subsequent ion exchange processes are conducted. Where the ion exchange process includes contacting more than one type of ion exchange source to the surface of the glass article, multiple sequential heating steps may be required to exchange the differing ions in the more than one type of ion exchange sources with ions in the originally formed glass matrix. However, as discussed in embodiments below, using a localized heat source may allow the glass article to have ion-exchanged regions with differing characteristics.

As used herein, "characteristics" of ion-exchanged regions may mean any parameter of the ion-exchanged region. Examples of ion-exchanged region characteristics include, but are not limited to, the depth of the ion-exchanged region, the composition of the ion-exchanged region (e.g., $Na^+$, $K^+$, and $Ag^+$), and the concentration of ions in the ion-exchanged region, the optical refractive index, optical birefringence, the local compressive or tensile stress, the surface location of the ion exchange region (for example edge face vs. major surface), the optical absorption, scattering, or color, the local mechanical properties (for example Young's modulus, hardness, or fracture toughness), the chemical durability properties (for example acid etch characteristics).

Embodiments disclosed herein describe ion exchange processes that form glass articles with ion-exchanged regions having different characteristics. Some embodiments do not require multiple process steps, such as multiple masking and heating steps, by locally heating the glass article with a laser during the ion exchange process. Referring now to embodiments depicted in FIG. 1, a glass article 100 may have an ion exchange source 101 deposited on a surface thereof. The glass article 100 may be locally heated by laser energy 102 in a location where a first ion-exchanged region 103 is desired. The glass article 100 may be heated by laser energy 102 that travels through the ion exchange source 101. Using laser energy 102, the temperature of the local heated area in the glass article may be controlled to provide a desired ion exchange rate by changing the laser energy intensity and the duration of the exposure to the laser energy. For example, a longer duration of laser energy exposure may lead to an ion-exchanged region with greater depth than an ion-exchanged region formed with a shorter duration of laser energy. In embodiments, the temperature of the local heated area in the glass article may be greater than or equal to about 200° C., or even greater than or equal to about 300° C. In other embodiments, the temperature of the local heated area in the glass article may be greater than or equal to about 400° C. Locally heating the glass article may allow for temperature sensitive devices such as OLEDs, touch sensors, displays, lighting devices, and photovoltaics, organic TFTs, and other structures to be formed on the glass article prior to the laser ion exchange process. The laser ion exchange process is performed locally in a manner that does not thermally degrade these devices. To avoid glass deformation, the temperature of the local heated area in the glass article should be less than the melting temperature of the glass article. Accordingly, in embodiments, the temperature of the local heated area in the glass article may be less than or equal to about 800° C., or even less than or equal to about 700° C. In other embodiments, the temperature of the local heated area in the glass article may be less than or equal to about 600° C.

Embodiments as shown in FIG. 1 may also include an ion-exchanged region 104 that has different characteristics than the ion-exchanged region 103. Embodiments for forming two or more ion-exchanged regions 103, 104 having different characteristics are discussed in more detail below. The ion-exchanged regions 103, 104 may be formed at any location in the glass sheet or three dimensional glass article. In some embodiments, such as those depicted in FIG. 1, ion-exchanged region 103 may be adjacent to ion-exchanged region 104. However, in other embodiments, an ion-exchanged region may be offset from another ion-exchanged region(s) or located on differing surfaces of the glass article.

Glass Article

The composition of the glass article may comprise various glass compositions suitable for ion exchange processes. In embodiments, the glass article may be formed from soda-lime glass, aluminosilicate glass, alkali-aluminosilicate glass, alkaline earth aluminosilicate glass, boro-aluminosilicate glass, alkaline earth boro-aluminosilicate glass, and the like. In some embodiments, the composition of the glass article may not contain any alkali metals. In some embodiments, the glass article may be pure silica. In such embodiments, waveguides may be formed by diffusing alkali metal ions into the glass at high temperatures using laser heating. Thereby, low-loss waveguides may be produced on pure silica substrates.

The glass article may be of any shape or size. In some embodiments, the glass article may be a flat sheet having a uniform thickness. In other embodiments, the glass article may have a three-dimensional shape with varying dimensions. The ion exchange process can be performed with a single glass article or multiple glass articles bonded together or adjacent to each other. The three-dimensional glass article has multiple surfaces depending on its specific shape that include both major surface areas as well as the surfaces of the edge faces. The ion exchange processes described herein may be performed on glass articles having any thickness; including glass articles with thicknesses that are less than or equal to about 0.5 mm, which may be difficult to handle using conventional molten salt bath ion exchange processes. In fact, when conventional ion exchange processes using molten salt baths are performed on glass articles having thicknesses less than or equal to about 100 μm, high losses may be realized due to stresses present at the edges of the glass article. Further, conventional ion exchange processes using a molten salt bath cannot be performed on glass articles having thicknesses less than or equal to about 50 μm, because these thin glass articles do not survive the ion exchange process.

In contrast to conventional ion exchange processes, ion exchange processes, according to embodiments, may be performed on very thin glass articles. In fact, as the thickness of the glass article decreases, the localized control of the temperature distribution may increase. For example, when laser energy is incident on a surface of a thin glass sheet, heat generated by the laser energy may not be as readily absorbed throughout a thin glass sheet as the heat would be absorbed in a thicker glass sheet. Thus, although the ion exchange processes disclosed herein may be used on glass articles having any thickness, embodiments of the ion exchange processes may be performed on thin glass articles having thicknesses less than or equal to about 300 μm, or even less than or equal to about 250 μm. Some embodiments of the ion exchange processes may be performed on thin glass articles having thicknesses less than or equal to about 200 μm, or even less than or equal to about 150 μm. Other embodiments of the ion exchange processes may be performed on thin glass articles having thicknesses less than or equal to about 100 μm, or even less than or equal to about 50 μm.

The glass article may have a single layer, such as the glass article 100 depicted in FIG. 1. However, in some embodiments, the glass article may have multiple layers or the glass article may be a composite stack. In embodiments where the glass article has multiple layers or is a composite stack, the glass article may include layers that are not glass. In such embodiments, layers of the glass articles may be made of glass ceramic, ceramic, metal, or organic materials. However, at least a portion of the glass article that is to be contacted with an ion exchange source should comprise a composition that is suitable for ion exchange.

Ion Exchange Source

The ion exchange source may be any suitable composition that is capable of exchanging ions with the glass article. In embodiments, the ion exchange source may be a molten salt, a solution, a solid thin film, or a paste. In some embodiments, the glass article may be submerged into a molten salt bath that is heated to a temperature sufficient to keep the salt in a liquid state, but the salt bath may be at a temperature below the temperature that enables efficient ion migration. For example, in some embodiments the molten salt bath may be heated to a temperature of about 200° C., or even about 300° C. In some embodiments, the molten salt bath may be heated to a temperature of about 400° C.

The ion exchange source may be contacted with the glass article by any suitable process. In embodiments, the ion exchange source may be contacted with the surface of the glass article by, for example, spray coating, roll coating, molding, or brush coating. In yet other embodiments, the ion exchange source may be printed onto the surface of the glass article to, for example, create a patterned layer by, for example, an inkjet printing method or a needle injection method. In some embodiments, the ion exchange source may be contacted with the glass article by submerging the glass article in a molten salt bath or salt solution.

The ion exchange source may be contacted with any surface of the glass article. In some embodiments, the ion exchange source may be contacted with a surface of the glass article where the laser will not be incident. In some other embodiments, the ion exchange source may be contacted to a surface of the glass article where the laser is to be incident. In embodiments where the ion exchange source is contacted with a surface of the glass article where the laser will be incident, the ion exchange source may be transparent, or substantially transparent, to the laser wavelength or otherwise enable heat transfer to the glass article. An ion exchange source that is transparent, or substantially transparent, to the wavelength of the laser energy allows the laser energy to be directly absorbed by the glass and can produce very localized heating. Thus, in embodiments, the laser source may be matched to the ion exchange source so that the ion exchange source is transparent, or substantially transparent, to the laser wavelength. As used herein, "substantially transparent" refers to transmission of at least about 10% of the laser energy.

Figure 2A:
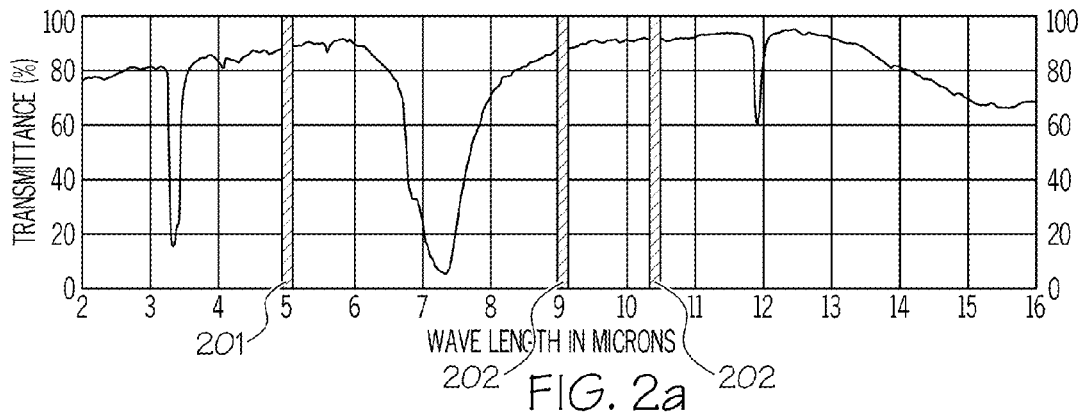
FIG. 2($a$) is an IR transmission of $NaNO_3$.
Figure 2B:
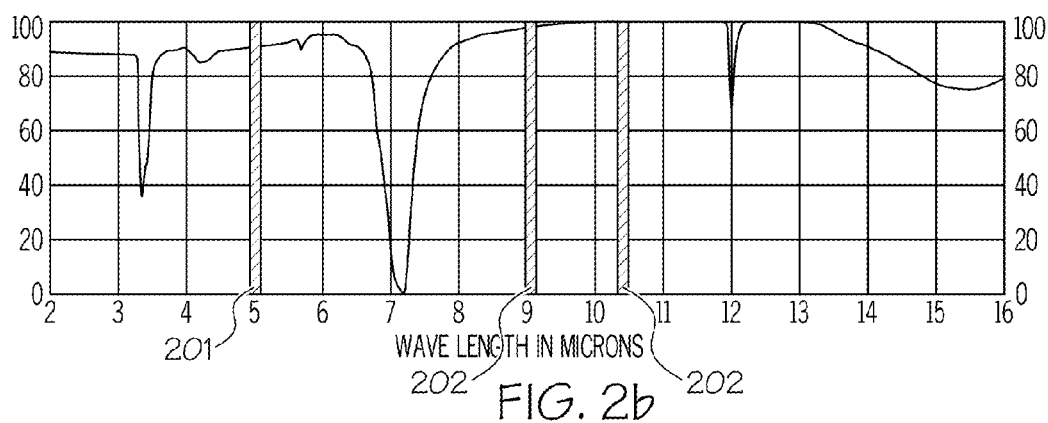
Figure 2C:
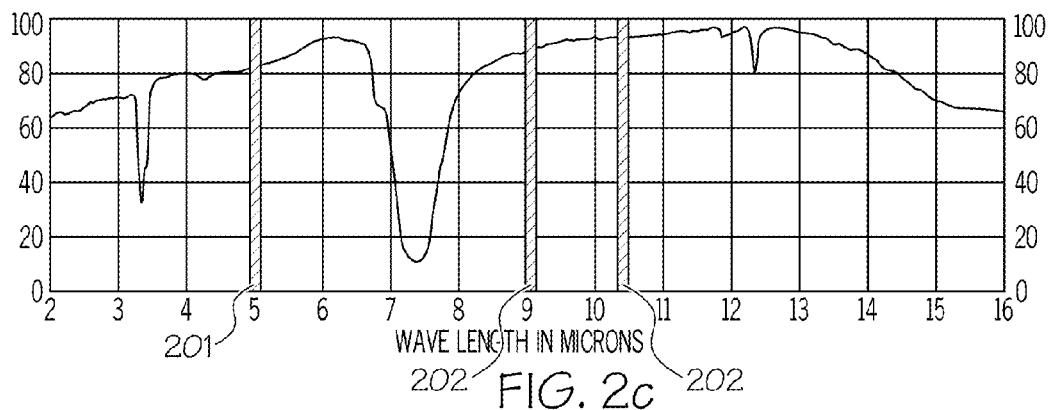

The ion exchange source may be any composition suitable for exchanging ions with the glass article. In embodiments, the ion exchange source may be a nitrate, a sulfate, or a phosphate, such as $NaNO_3$, $KNO_3$, or $AgNO_3$. FIGS. 2(*a*)-2(*c*) show IR transmissions for $NaNO_3$, $KNO_3$, and $AgNO_3$. Wavelengths at which $NaNO_3$, $KNO_3$, and $AgNO_3$ absorb energy are indicated by dips in the IR transmissions of FIGS. 2(*a*)-2(*c*). For example, FIG. 2(*a*) shows that $NaNO_3$ absorbs energy at wavelengths of about 7.36 μm and about 11.96 μm. Thus, $NaNO_3$ is transparent, or substantially transparent, to lasers having wavelengths below 7.36 μm and wavelengths between 7.36 μm and 11.96 μm. FIG. 2(*b*) shows that $KNO_3$ absorbs energy at wavelengths of about 7.25 μm and about 12.14 μm. Thus, $KNO_3$ is transparent, or substantially transparent, to lasers having wavelengths below 7.25 μm and wavelengths between 7.25 μm and 12.14 μm. FIG. 2(*c*) shows that $AgNO_3$ absorbs energy at wavelengths of about 7.42 μm and about 12.45 μm. Thus, $AgNO_3$ is transparent, or substantially transparent, to lasers having wavelengths below 7.42 μm and wavelengths between 7.42 μm and 12.45 μm. Using the IR transmissions, ion exchange sources, such as $NaNO_3$, $KNO_3$, and $AgNO_3$, may be paired with a laser source so that the ion exchange source is transparent, or substantially transparent, to the laser wavelength, thereby providing efficient localized heating of the glass article.

In embodiments where the ion exchange source is contacted with a surface of the glass article on which the laser energy source will not be incident, there is no concern that the laser energy will be absorbed by the ion exchange source, which may lower the efficiency of laser heating. Accordingly, in such embodiments, the ion exchange source may or may not be transparent, or substantially transparent, to the laser wavelength.

Laser Source

Any suitable laser source that results in direct or indirect heating of the glass article may be used. In some embodiments, the laser source may be selected from a CO laser, a $CO_2$ laser, or an infrared laser, such as a quantum cascade laser. Selection of the laser source may cause a predominant heating of the glass article surface may having most of the laser energy absorbed by the glass surface or material near the glass surface. Other laser source choices may create bulk heating effects in the glass article by having a substantial portion of the laser energy absorbed throughout the glass article thickness. In embodiments where the laser is incident on a surface of the glass article on which the ion exchange source is not contacted, there may be little or no benefit to selecting a laser so that the ion exchange source is transparent, or substantially transparent, to the laser energy.

In some embodiments, the laser source may be chosen so that the ion exchange source is transparent to the wavelength of the laser source. Referring again to FIGS. 2(a)-2(b), a CO laser 201 is shown to have a wavelength of about 5.30 μm, which falls within the transparent regions for $NaNO_3$, $KNO_3$, and $AgNO_3$. Thus, $NaNO_3$, $KNO_3$, and $AgNO_3$ will be transparent to a CO laser having a wavelength of about 5.00 μm. Similarly, a $CO_2$ laser 202 is shown to have wavelengths of about 9.25 μm or of about 10.60 μm, which fall within the transparent regions for $NaNO_3$, $KNO_3$, and $AgNO_3$. Thus, $NaNO_3$, $KNO_3$, and $AgNO_3$ will be transparent to a $CO_2$ laser having a wavelength of about 9.25 μm or having a wavelength of about 10.60 μm. Other laser sources that have wavelengths falling within the transparent regions of the above ion exchange sources may also be selected.

The laser source may be applied to the glass article by any suitable mechanism. In some embodiments, the laser source may be highly focused and guided by suitable positioning systems to provide precision ion-exchanged regions to the glass article. In other embodiments, the laser source may have different optical configurations to enable single exposure of the glass, such as, but not limited to, a translation stage or scanned motion via, for example, an optical scanner.

Ion Exchange Process Configurations

It should be understood that many ion exchange process configurations may be used. Various embodiments of ion exchange process configurations are described below; however, the embodiments below are not an exhaustive list of all possible configurations, and other configurations are within the scope of this disclosure.

Referring again to FIG. 1, embodiments of the ion exchange process configuration may comprise contacting an ion exchange source 101 to at least one surface of a glass article 100 (although FIG. 1 shows only one surface of the glass article having an ion exchange source contacted thereto, it should be understood that an ion exchange source may be contacted with multiple surfaces of the glass article). As discussed above, the ion exchange source 101 may be contacted with surfaces of the glass article 100 by any suitable process, such as, for example, immersion in a salt bath, spray coating, roll coating, or brush coating. Once the ion exchange source 101 has been contacted with a surface of the glass article 100, laser energy 102 is incident on the surface of the glass article 100 on which the ion exchange source 101 has been contacted. Besides use of the laser energy to drive the ion exchange process, the laser energy can also be used to volatize any other components used in an ion source transfer process. For example, the laser energy can be used to volatize water, solvent, surfactant, binder, or other components in the ion exchange source that enables efficient printing or transfer. As discussed above, in some embodiments, the laser source and the ion exchange source may be selected so that the ion exchange source is transparent, or substantially transparent, to wavelengths of the laser energy 102. A localized portion of the glass article 100 on which the laser energy 102 is incident is heated, thereby initiating ion exchange between the glass article 100 and the ion exchange source 101 at the localized portion of the glass article. Thus, an ion-exchanged region 103 is formed in the glass article 100 at the localized portion of the glass article.

According to embodiments, and as shown in FIG. 1, an ion-exchanged region 104 may be formed in the glass article 100. In some embodiments, the ion-exchanged regions 103, 104 may be formed simultaneously. In other embodiments, the ion-exchanged region 104 may be formed before or after the ion-exchanged region 103 is formed. In some embodiments, the ion-exchanged regions 103, 104 may have the same characteristics. In other embodiments, the ion-exchanged regions 103, 104 may have different characteristics. Different characteristics may be imparted to the ion-exchanged regions 103, 104 by, for example, varying the intensity of the laser energy, and/or the duration of the laser energy exposure. For example, a deeper ion-exchanged region, such as ion-exchanged region 103 compared to ion-exchanged region 104, may be formed in the glass article 100 by allowing the duration of the laser energy 102 to be longer over a portion of the glass article 100 where ion-exchanged region 103 is formed than the duration of the laser energy over the portion of the glass article 100 where ion-exchanged region 104 is formed.

Figure 3:
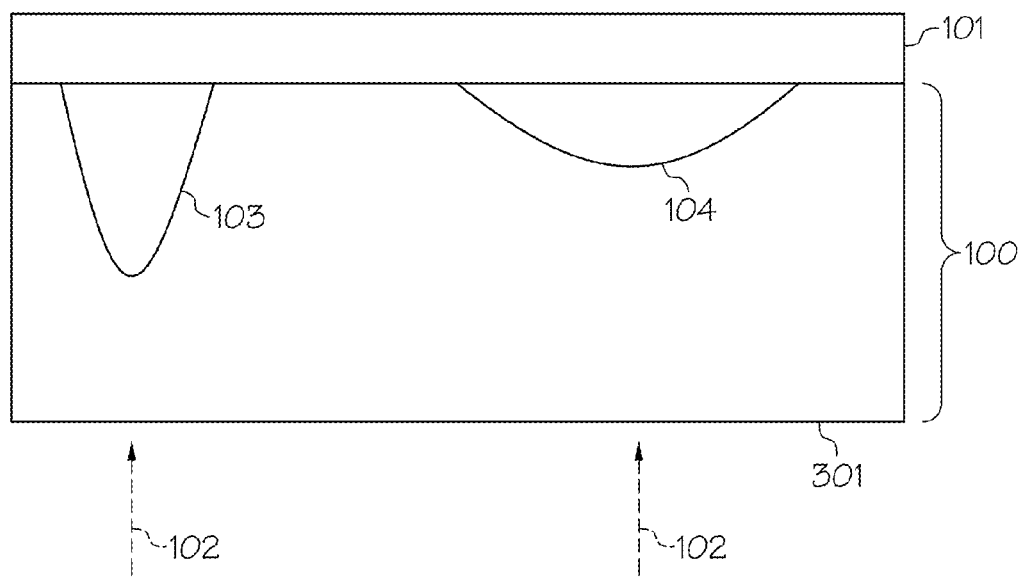
FIG. 3 schematically depicts embodiments of a glass article having ion-exchanged regions formed by laser energy incident on a surface of the glass article where an ion exchange source is not contacted.

Referring now to FIG. 3, in embodiments, laser energy 102 may be incident on a surface of the glass article 100 on which an ion exchange source 101 is not contacted. Similarly to embodiments discussed above, embodiments of the ion exchange process configuration may comprise contacting an ion exchange source 101 to at least one surface of a glass article 100. However, in some embodiments, at least one surface 301 of the glass article 100 may not be contacted with an ion exchange source. Once the ion exchange source 101 has been contacted with a surface of the glass article 100, laser energy 102 is incident on the surface 301 of the glass article 100 that is not contacted with the ion exchange source. The laser energy is locally absorbed by the glass article 100 and heats a portion of the ion exchange source 101 across the glass article from where the laser energy is incident, thereby initiating ion exchange between the glass article 100 and the ion exchange source 101. Depending on the laser wavelength used, the laser energy may be substantially absorbed by the glass surface 301 or absorbed in a distributed manner throughout the glass thickness. Thus, an ion-exchanged region 103 is formed in the glass article 100 at the localized portion of the glass article. In FIG. 3, the laser energy is transmitted across the thickness dimension of the glass article; however, it should be understood that the laser energy may be incident on any surface of the glass article.

As shown in FIG. 3, according to embodiments, a second ion-exchanged region 104 may be formed in the glass article 100. In some embodiments, the ion-exchanged regions 103, 104 may be formed simultaneously. In other embodiments, the ion-exchanged region 104 may be formed before or after ion-exchanged region 103 is formed. In embodiments, the ion-exchanged regions 103, 104 may have the same characteristics. In some embodiments, the ion-exchanged regions 103 and 104 may have different characteristics.

Figure 4:
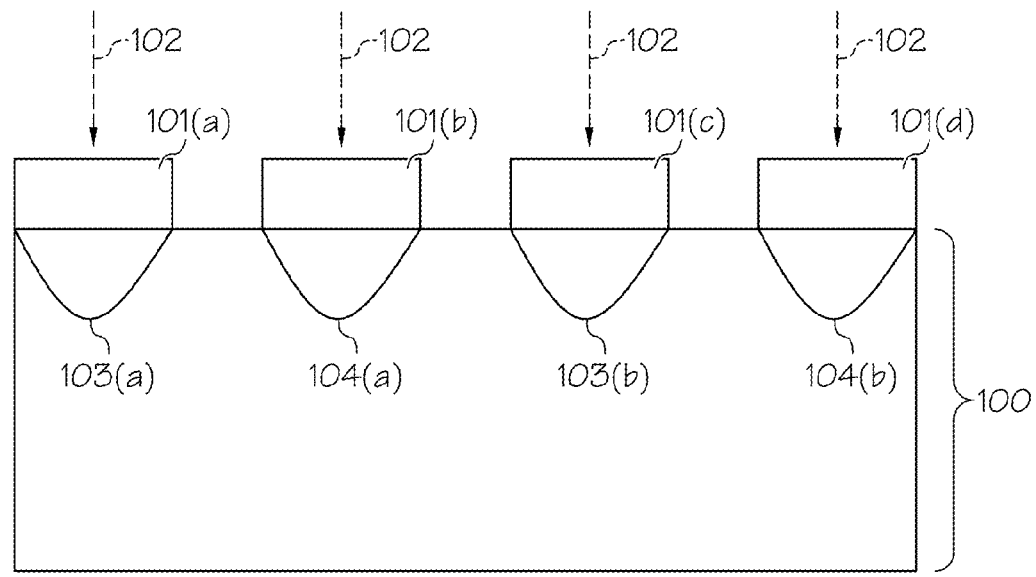
FIG. 4 schematically depicts embodiments of a glass article having a patterned ion exchanged source applied to a surface thereof and ion-exchanged regions formed by laser energy incident on a surface of the glass article where an ion exchange source is contacted.

Referring now to FIG. 4, in embodiments, the ion exchange source 101 may be a patterned ion exchange source 101(a)-101(d). Although FIG. 4 shows a pattern according to some embodiments, many other patterns may be used in other embodiments. The patterned ion exchange source 101(a)-101(d) may be applied to the glass article 100 by any suitable method, such as needle injection, ink-jetting, or application with a sponge, brush, pad, stamp, engraved roller, or blade. In some embodiments, the patterned ion exchange source 101(a)-101(d) may comprise one ion exchange source. In other embodiments, the patterned ion exchange source 101(a)-101(d) may comprise more than one ion exchange source. For example, patterned ion exchange source 101(a) and 101(c) may be comprised of one ion exchange source, such as, for example, $AgNO_3$, and may form ion-exchanged regions 103(a) and 103(b). Patterned ion exchange source 101(b) and 101(d) may be comprised of another ion exchange source, such as, for example, $KNO_3$, and may form ion-exchanged regions 104(a) and 104(b). In some embodiments, laser energy 102 may be incident on the patterned ion exchange source 101(a)-101(d). In some embodiments, laser energy may be incident on a side of the glass article where an ion exchange source is not contacted.

In embodiments where the patterned ion exchange source 101(a)-101(d) comprises more than one ion exchange source, each ion exchange source may require different thermal conditions to initiate the ion exchange process between the glass article 100 and the patterned ion exchange source 101(a)-101(d). In such embodiments, laser parameters, such as, for example, laser intensity and duration of laser energy exposure may be adjusted for each patterned ion exchange source 101(a)-101(d) to provide the energy necessary to initiate ion exchange between the patterned ion exchange source 101(a)-101(d) and the glass article 100. Therefore, multiple ion-exchanged regions may be formed with different ion exchange sources in a single step. In this and other embodiments, the glass article can be free standing or held stationary in a fixed position with a vacuum chuck or other mechanical mount. Air bearings, air bars, or similar devices can be used to control the glass article positioning and thermal gradients.

Figure 5:
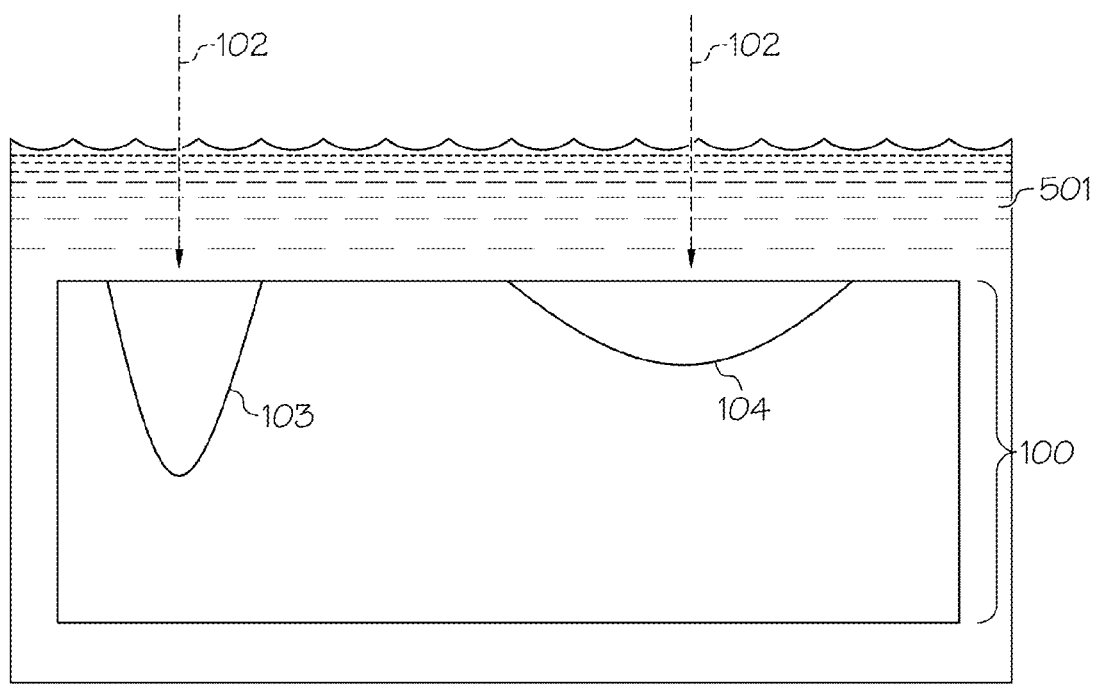
FIG. 5 schematically depicts embodiments of a glass article submerged in a molten salt bath.

Referring now to FIG. 5, embodiments may include an ion exchange process configuration comprising a molten salt bath 501. As with conventional ion exchange processes that use molten salt baths, a glass article 100 may be submerged in the molten salt bath 501. In conventional ion exchange processes using a molten salt bath, the molten salt bath is generally heated to a temperature that not only maintains the salt in a molten state, but also is high enough to drive the ion exchange process. This may require heating the molten salt to a temperature near its decomposition temperature, which may negatively impact the ion exchange process. However, unlike conventional ion exchange processes using a molten salt bath, in embodiments, the molten salt bath 501 may be heated to a temperature just high enough to maintain the salt bath in a molten state. The glass article 100 may be submerged in the molten salt bath 501. Laser energy 102 may then be incident on a surface of the glass article 101 where the ion-exchanged regions 103, 104 are to be formed. The laser energy 102 may locally heat the glass article to a temperature that is sufficient to drive the ion exchange process, thereby forming ion-exchanged regions 103, 104 where the laser energy 102 is incident on the glass article 100. In embodiments, the ion exchange source may be transparent, or substantially transparent, to the wavelength of the laser, thus allowing efficient and localized heating of the surface of the glass article. This embodiment achieves a minimal ion exchange process over the contacted surface and an increased ion exchange process in the locations where the laser source locally heats the glass article 100. Besides complete submersion of the glass article 100 in the salt batch 501, similar effects can be obtained by globally heating a coated glass article shown in FIG. 1 and FIG. 3 along with locally laser heating in selected locations to drive the ion exchange process.

In some embodiments, during the ion exchange process, the glass article may be elevated using supports at two opposite ends, so that areas of the glass article contacting the ion exchange source, and the area immediately underneath the area contacting the ion exchange source, are not in contact with the support structures. In other embodiments, support structures where the glass article is in contact with the support structure along the back surface to control position, flatness, or thermal properties of the glass article may be used during the ion exchange process.

Although not explicitly disclosed in the embodiments described above, each of the ion exchange processes may be conducted after ion-exchanged regions have been formed on the glass article. The prior ion-exchanged regions may be formed by any suitable method, including, for example, the methods disclosed above as well methods using a molten salt bath. Accordingly, in some embodiments, the ion exchange processes disclosed above may be used to form additional ion-exchanged surfaces on glass articles that already have ion-exchanged surfaces formed thereon.

Features of Ion-Exchanged Regions

In some embodiments, parameters of the laser, such as, for example, laser energy intensity and duration of the laser energy exposure, may be varied when the laser energy is incident on different parts of the glass article. Varying the laser parameters enables controlled ion diffusion into the glass article and, thus, can be used to create ion-exchanged regions with different characteristics. Embodiments described below describe various features of the ion-exchanged regions. However, the features disclosed below are not meant to be an exhaustive list, and other features of the ion-exchanged regions are within the scope of this disclosure.

As disclosed above, ion concentration in the ion-exchanged regions and depth of the ion-exchanged regions may be varied based laser parameters such as, for example, laser energy intensity and duration of exposure to the laser energy. Accordingly, in some embodiments, multiple ion exchanged regions having different characteristics may be distributed across the surface of the glass article. For example, in some embodiments, ion-exchanged regions near the edges of the glass article may have a greater concentration of exchanged ions and/or a greater depth than ion-exchanged regions located further from the edges (e.g., toward the center) of the glass article. In some embodiments, ion-exchanged regions near the edges of the glass article may have a lower concentration of exchanged ions and/or a more shallow depth than ion-exchanged regions located further from the edges (e.g., toward the center) of the glass article. In some embodiments, the ion exchange concentration may be varied (i.e., a greater or lesser ion exchange concentration) at locations where the glass article is to be cut, thereby facilitating the cutting process.

Figure 6:
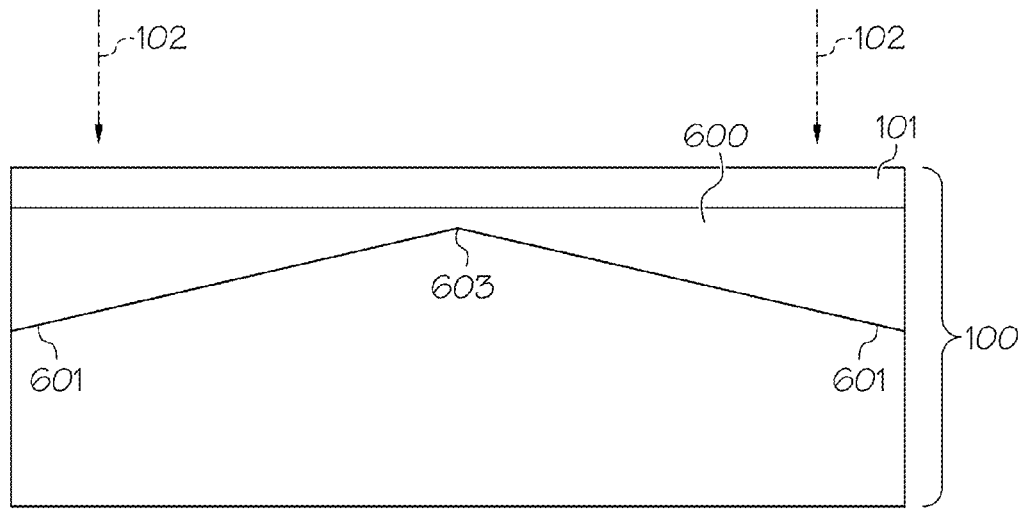
FIG. 6 schematically depicts embodiments of a glass article having increased ion concentration and depth at edges of the glass article.

For example, referring to FIG. 6, a portion of an ion-exchanged region 600 near the edge 601 of the glass article 100 may have a higher concentration of ions or a greater depth than a portion of an ion-exchanged region 600 near the center 603 of the glass article. As discussed above, in some embodiments the ion exchange concentration may be varied by adjusting the intensity or duration of exposure to the laser energy at a particular location of the glass article. For example, in some embodiments $K^+$ ions may be exchanged for $Na^+$ ions across the surface of the glass article, except in locations where the glass article is to be cut, thereby providing a surface that has not been strengthened where the glass article is to be cut. In other embodiments, $K^+$ ions may be exchanged for $Na^+$ ions across the surface of the glass article and then $Na^+$ ions may be exchanged back into the glass article at locations where the glass article is to be cut, drilled, or machined, thereby providing a surface that is less strengthened where the glass article is to be machined. For example, this creates locations for further laser or mechanical singulation, laser or mechanical or wet etch via hole formation, or other localized creation of features in the glass article.

In some embodiments, the ion exchange process may occur at least locally along the edges after the glass article has been cut. For example, in some embodiments, only the edges that have been cut may be subjected to the ion exchange process by, for example, applying an ion exchange source to the edges of the glass article (edge face) and then providing laser energy incident on at least a portion of the edges of the glass article (edge face) where the ion exchange source has been applied. In this embodiment, a dam or physical barrier can be used to contain the ion source on the edge face of a single or multiple glass articles. Alternatively, in other embodiments, the edges of the glass article may be subjected to an ion exchange process by submerging the glass article into a molten salt bath and then providing laser energy incident on the edges of the glass article. In either embodiment, the laser energy can be directed onto the edge face of the glass article or onto another surface adjacent to the edge to be ion exchanged. As used herein, an edge face of the glass article need not be located at the perimeter of the glass article. For example, in embodiments one or more shapes may be cut into the glass article creating a through-hole or an indentation having the designated shape. These shapes may be located at any position in the glass article and, thus, in some embodiments the shape may be formed entirely within the glass article, while in other embodiments the shape may be formed partially within the glass article. In such embodiments, the edge face may be positioned along the perimeter of the shape cut into the glass article.

In some embodiments, ion-exchanged regions may be formed on the edges of a glass article without contacting the edges of the glass article with an ion exchange source. For example, in some embodiments, the glass article may be a thin sheet, and the two surfaces comprising the most surface area may be contacted with an ion exchange source (i.e., the edges of the glass sheet are not contacted with an ion exchange source). Laser energy may be applied to the surfaces of the glass sheet to which the ion exchange source has been contacted. The intensity of the laser energy and/or the duration of exposure to the laser energy may be such that the depths of the ion-exchanged regions near the edges of the glass sheet cover the edges of the glass sheet. In another embodiment, the ion exchange source can be applied to the surface near the edge, and the laser energy can be directed to the glass edge face directly. In this case the laser energy incident on the edge face creates local heating and controls the ion exchange process with the ion exchange source located at a neighboring surface.

Figure 7:
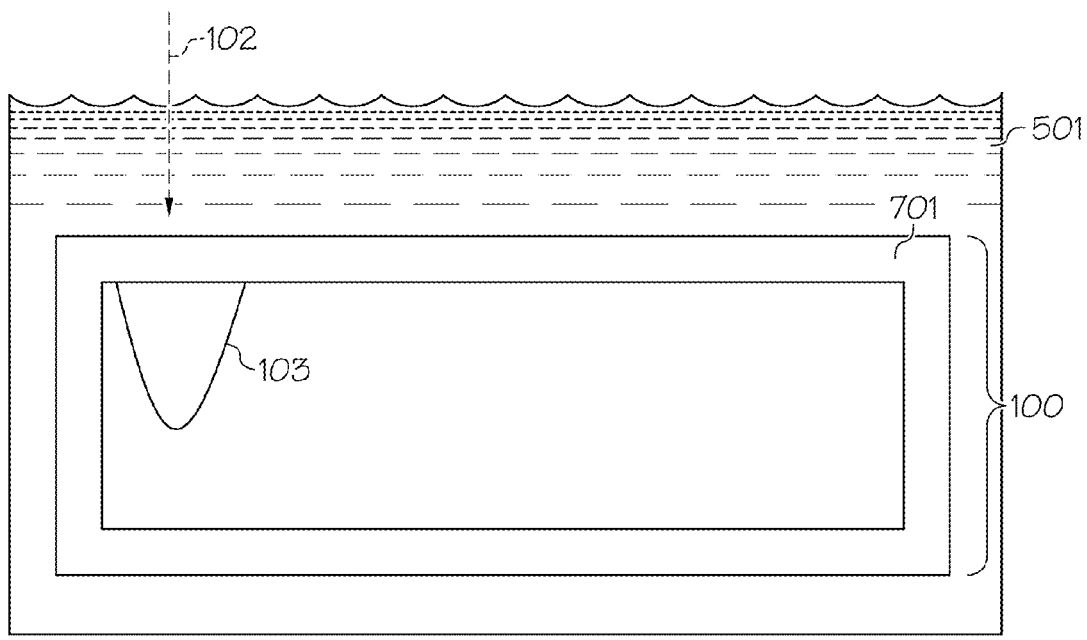
FIG. 7 schematically depicts embodiments of a glass article having ion-exchanged regions on multiple surfaces thereof.

Referring now to FIG. 7, in some embodiments, two separate sets of ion-exchanged regions 103, 701 which may or may not have different characteristics, may be formed on opposite sides of the glass article. For example, in some embodiments, the glass article may be submerged into a molten salt bath that causes a slow ion exchange on all surfaces of the glass article, thereby forming a uniform ion-exchanged region 701 on all surfaces of the glass article. Exposure to laser energy 102 may be used to form additional ion-exchanged regions 103 on one or more surfaces of the glass article. The ion-exchanged regions 701 and 103 may occur in any time sequential or parallel order. In other embodiments, a glass article may be submerged in a molten salt bath and exposure to laser energy may be incident on more than one side of the glass article, thereby forming ion-exchanged regions on both surfaces of the glass article. In other embodiments, an ion exchange source may be applied to one or more surfaces of the glass article and laser energy may be incident on different portions of the glass article with varying intensity and/or duration so that multiple ion-exchanged regions are formed.

Patterns of ion-exchanged regions may be formed in the glass article by varying the parameters of the laser energy. Also, because the laser energy locally heats only a small portion of the glass article, very precise patterns of ion-exchanged regions may be formed in the glass article. Although such features are useful for many different types of glass articles, they can be particularly useful for optical interconnect applications. In some embodiments, a mode shape of an ion exchanged waveguide may be varied by controlling the parameters of the laser energy during the ion exchange process. In some embodiments, for example, the mode shape near an edge of the glass article may be configured to facilitate fiber coupling while other areas of the ion-exchanged waveguide may be configured for low loss optical propagation. These features may be achieved by varying the ion exchange concentration, ions exchanged, and/or mode shape near waveguide bends to produce more confined optical modes and reduced waveguide bend radii.

In some embodiments the ion-exchanged regions formed in the glass article may have a depth of greater than about 1 μm, or even greater than about 2 μm. In some embodiments, the ion-exchanged regions may have a depth of from about 5 μm to about 60 μm, such as from about 10 μm to about 50 μm. In other embodiments, the ion-exchanged regions formed in the glass article may have a depth from about 15 μm to about 40 μm, or even from about 20 μm to about 30 μm.

EXAMPLES

Embodiments will be further clarified by the following examples.

Example 1

A 100 mm×100 mm glass sheet having a thickness of approximately 300 μm was formed from an aluminosilicate glass composition comprising from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO. The glass is described in U.S. patent application Ser. No. 12/856,840 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009, the contents of which are incorporated herein by reference in their entirety. The glass sheet was then placed on a hot plate, and $KNO_3$ salt pellets were placed on the surface of the glass sheet. The hot plate temperature was increased to 400° C., which caused the $KNO_3$ salt pellets to melt. A $CO_2$ laser with a wavelength of approximately 10.6 μm was rastered for five minutes through the $KNO_3$ salt melt and incident on the surface of the glass sheet. The rastered area was approximately 20 mm×20 mm.

Ion exchange was observed using an FSM6000LE stress meter manufactured by Orihara Industrial Co., Ltd.

Example 2

A 100 mm×100 mm glass sheet having a thickness of approximately 300 μm was formed from an aluminosilicate glass composition comprising from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO. The glass is described in U.S. patent application Ser. No. 12/856,840 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009, the contents of which are incorporated herein by reference in their entirety. $KNO_3$ salt pellets were placed on the surface of the glass sheet at room temperature (approximately 20° C.). A $CO_2$ laser with a wavelength of approximately 10.6 μm was rastered for five minutes incident on the glass sheet surface that had the $KNO_3$ pellets on it. The laser exposure heated the glass sheet, first causing the $KNO_3$ salt pellets to melt, and then initiating the ion exchange process between the $KNO_3$ salt melt and the glass article. The rastered area was approximately 20 mm×20 mm. In some embodiments, the glass article may have possessed regions that had previously undergone ion exchange processes using various techniques.

Ion exchange was observed using a FSM6000LE stress meter. The depth of the ion-exchanged region was measured to be 18 μm, and the compressive stress was measured to be 610 MPa.

Figure 8A:
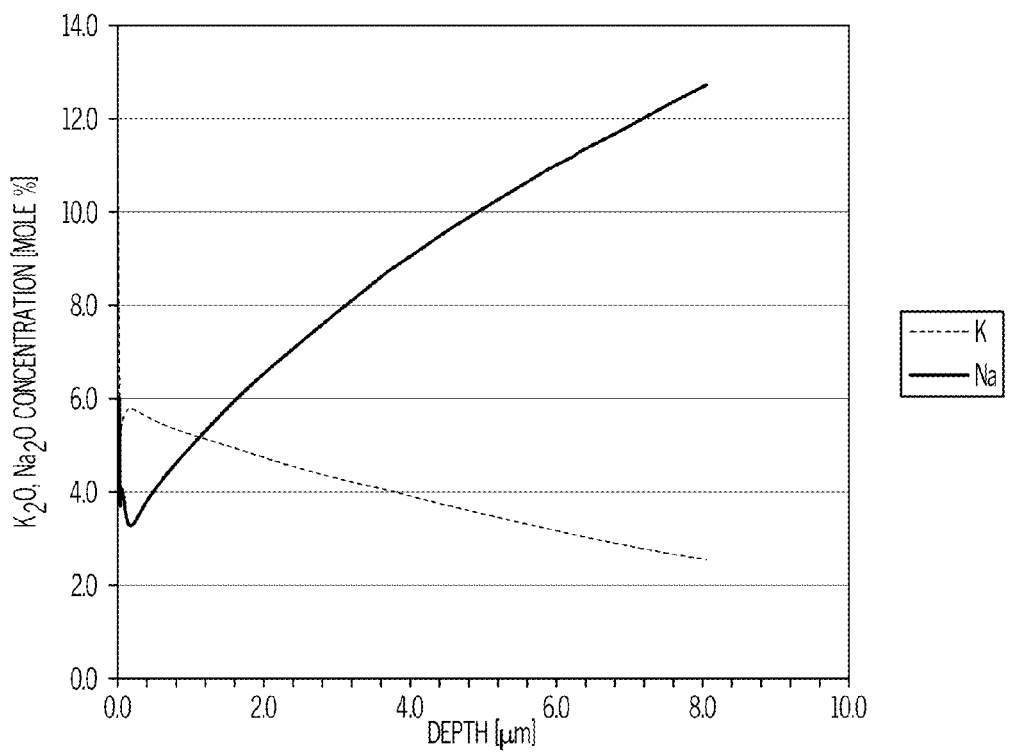
FIG. 8($a$) is a SIMS graph of a glass sheet that has been subjected to an ion exchange process.
Figure 8B:
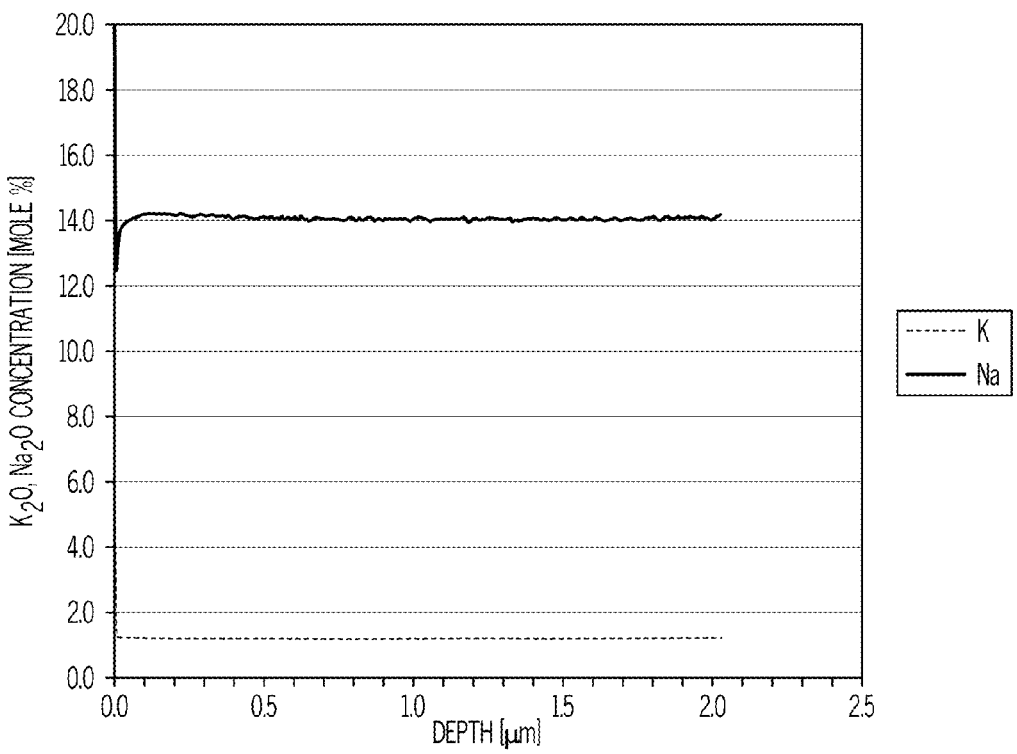

The ion exchange was also verified through SIMS analysis. FIG. 8(a) is a plot of $Na_2O$ and $K_2O$ concentrations of a glass sheet that has been ion exchanged. FIG. 8(b) is a plot of $Na_2O$ and $K_2O$ concentrations of a glass sheet that has not been ion exchanged. As shown in FIG. 8(a), the glass sheet on which an ion exchange process has been conducted has a minimum $Na_2O$ concentration of less than 4%, and a maximum $K_2O$ concentration of about 6% near the glass surface. The depth of the ion-exchanged region is approximated, through SIMS analysis, to be about 10 μm (SIMS analysis only provides an approximation of ion-exchanged region depth). As shown in FIG. 8(b), the glass sheet on which an ion exchange process has not been conducted has a $Na_2O$ concentration of about 14% and a $K_2O$ concentration less than 2%.

Example 3

A 100 mm×100 mm glass sheet having a thickness of approximately 300 μm was formed from an aluminosilicate glass composition. A $KNO_3$ salt paste mixture was prepared by combining $KNO_3$ (Sigma Aldrich Reagent Plus®≥99.0%) with DI water at a salt:water ratio of 1:0.1. Too little water may cause poor adhesion to the glass substrate, and too much water may cause excessive salt crystal growth during drying. The salt and water mixture was then applied to a surface of the glass sheet with a spatula pressing the mixture into a thin layer having a defined area and an approximate thickness of less than 1 mm. The substrate was elevated from the table top using supports at two opposite ends so that both areas of the glass substrate contacting the salt, and the area immediately underneath it, were not in contact with support structures. A $CO_2$ laser with a wavelength of approximately 10.6 μm was rastered on the glass substrate surface that was in contact with the salt. These conditions were used in pre-dried samples, where the salt mixture was dried after applying it to the glass, as well as immediately after applying the salt mixture, where residual water still present. Pre-drying was conducted by applying the glass substrate to a 150° C. hot plate. In the cases where water remained, the laser energy was first used to volatize the water. Both the volatilizing of the water and locally melting the $KNO_3$ occurred in about 60 seconds or less after initial laser exposure. To control the substrate heating, both laser raster patterns of linear side-side and spiral scanning were performed, creating a 50 mm diameter circular exposure zone. A clearly defined boundary was observed between the salt melted by the laser and the salt not melted. The laser power was varied for different samples from 20-90 W. The exposure time was varied from 1-20 minutes. Depth of layers of up to approximately 10 μm were obtained with compressive stresses of up to approximately 1000 MPa as measured using a FSM6000LE stress meter. Variations on the depth of layer and compressive stress were observed due to the varying thermal profile across the substrate surface.

Example 4

Laser controlled ion exchange was demonstrated with substrates possessing mechanically drilled holes. Aluminosilicate glass substrates having a thickness of a 0.5 mm and having mechanically-drilled holes were formed. The mechanically drilled holes were formed after an initial ion exchange was conducted in a molten salt batch. Mechanically forming the holes after the molten salt ion exchange leaves the edge face of the holes with exposed compressive and tensile regions. In this Example, the laser-induced ion exchange process included placing a salt paste or pellet of $KNO_3$ into or adjacent to the mechanically drilled holes. A $CO_2$ laser with a wavelength of approximately 10.6 μm was then scanned around the perimeter of the hole at a diameter of about 6 mm, so the laser was not directly incident on the $KNO_3$. The laser had a power of 8.0 W and was scanned at a speed greater than 1 m/s. The duration of the scan was about 3.0 minutes. This laser exposure heated the glass and melted the $KNO_3$. Ring-on-ring measurements were performed after the $KNO_3$ was melted and indicated that the strength of the glass substrate increased from 90 MPa with the non-laser-processed samples to 500 MPa for the laser-processed samples.

Example 5

Laser controlled ion exchange was demonstrated with substrates possessing mechanically drilled holes. Aluminosilicate glass substrates were formed having mechanically-drilled 2 mm diameter holes created after an initial ion exchange in a molten salt batch was performed. Creating the holes after molten salt ion exchange leaves the edge face of the holes with exposed compressive and tensile regions. In this Example, the laser induced ion exchange process included placing a salt paste or pellet of $KNO_3$ into or adjacent to the mechanically-drilled holes. A $CO_2$ laser with a wavelength of approximately 10.6 μm was then scanned around the perimeter of the hole at a diameter of about 6 mm, so the laser was not directly incident on the $KNO_3$. The laser had a power of 8.0 W and was scanned at a speed greater than 1 m/s. The duration of the scan was about 1.5 minutes. This laser exposure heated the glass and melted the $KNO_3$. Ring-on-ring measurements were performed and indicated that the strength of the glass substrate having mechanically-drilled holes increased from 90 MPa of the non-laser processed samples to above 180 MPa for the laser-processed samples. Further, even though the salt was applied to the top surface of the glass substrate and the laser was incident on the top surface of the glass substrate, both the top and bottom surfaces had similar measured ring-on-ring strength results.

It will be apparent to those skilled in the art that various modifications and variations may be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming ion-exchanged regions in a glass article, the method comprising:
   contacting an ion exchange source with at least one surface of the glass article;
   forming a first ion-exchanged region in the glass article by heating a first portion of the glass article with laser energy, wherein the first ion-exchanged region comprises a first compressive stress; and
   forming a second ion-exchanged region in the glass article by heating a second portion of the glass article with laser energy, wherein the second ion-exchanged region comprises a second compressive stress that is different from the first compressive stress,
   wherein at least a portion of the first ion-exchanged region is located at an edge face of the glass article, the second ion-exchanged region is located at a major surface of the glass article, and a concentration of ions in the first ion-exchanged region is greater than a concentration of ions in the second ion exchange region.

2. The method of claim 1, wherein a depth of the first ion-exchanged region is different than a depth of the second ion-exchanged region.

3. The method of claim 1, wherein a depth of each of the first and second ion-exchanged regions is from about 5 μm to about 60 μm.

4. The method of claim 1, wherein the glass article does not contain any alkali metal ions.

5. The method of claim 1, wherein the ion exchange source is selected from the group consisting of $KNO_3$, $NaNO_3$, and $AgNO_3$.

6. The method of claim 1, wherein the laser energy originates from a laser selected from the group consisting of a CO laser, a $CO_2$ laser, and an infrared laser.

7. The method of claim 1, wherein the laser is applied to a surface of the glass article where the ion exchange source is not contacted.

8. The method of claim 1, wherein multiple ion exchange sources are contacted on the at least one surface of the glass article and laser parameters are adjusted to produce ion-exchanged regions in the glass article for each ion exchange source.

9. The glass article of claim 1, wherein one of the first and second ion exchange sources is a molten salt bath having a temperature less than a temperature of about 400° C. or less.

10. The glass article of claim 1, wherein laser parameters are adjusted from the first ion-exchanged region to the second ion-exchanged region.

11. The glass article of claim 1, wherein at least one of the first and second ion exchange sources are contacted with the glass article in a pattern.

12. A method for forming ion-exchanged regions in a glass article, the method comprising:
    contacting an ion exchange source with at least a first surface of the glass article;
    forming a first ion-exchanged region in the first surface by heating a first portion of the glass article with laser energy, wherein the first ion-exchanged region comprises a first compressive stress; and
    forming a second ion-exchanged region in the glass article by heating a second portion of the glass article with laser energy, wherein the second ion-exchanged region comprises a second compressive stress that is different from the first compressive stress,
    wherein:
    an ion exchange source is contacted with a second surface of the glass article,
    ion-exchanged regions are formed on the second surface of the glass article,
    the first surface and the second surface are different surfaces, and
    characteristics of at least one ion-exchanged region on the first surface and the ion-exchanged regions on the second surface are different.

13. The method of claim 12, wherein the second ion-exchanged region is a plurality of ion-exchanged regions formed on the second surface of the glass article, wherein the plurality of ion-exchanged regions are substantially identical to one another.

14. The method of claim 12, wherein the second ion-exchanged region is formed on the second surface of the glass article, and a depth of the first ion-exchanged region is different than a depth of the second ion-exchanged region on the second surface.

15. The method of claim 12, wherein the second ion exchanged region is formed on the second surface of the glass article and a concentration of ions in the first ion-exchanged region on the first surface is different than a concentration of ions in the second ion-exchanged region on the second surface.

16. A method for forming ion-exchanged regions in a glass article, the method comprising:
    contacting multiple ion exchange sources with at least one surface of the glass article; and
    forming ion-exchanged regions in the glass article by heating a portion of the glass article with a laser, wherein laser parameters are adjusted to produce ion-exchanged regions in the glass article for each ion exchange source, the ion-exchanged regions for each ion exchange source having different compressive stresses,
    wherein a depth of the ion-exchanged region is greater than 1 μm.

17. The method of claim 16, wherein the multiple ion exchange sources are selected from the group consisting of $KNO_3$, $NaNO_3$, and $AgNO_3$.

18. The method of claim 16, wherein a portion of the ion-exchanged regions are formed at an edge face of the glass article.

* * * * *